(12) United States Patent
Iwase et al.

(10) Patent No.: US 10,274,727 B2
(45) Date of Patent: Apr. 30, 2019

(54) DEVICE CONTROLLING RANGE OF VISION

(71) Applicant: MAZDA MOTOR CORPORATION, Hiroshima (JP)

(72) Inventors: Koji Iwase, Hiroshima (JP); Yusaku Takeda, Higashihiroshima (JP); Toshihiro Hara, Hiroshima (JP); Atsuhide Kishi, Hiroshima (JP); Kazuo Nishikawa, Hiroshima (JP); Takahide Nouzawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/656,659

(22) Filed: Jul. 21, 2017

(65) Prior Publication Data

US 2018/0031831 A1 Feb. 1, 2018

(30) Foreign Application Priority Data

Jul. 26, 2016 (JP) .................. 2016-145886

(51) Int. Cl.
*G02B 27/01* (2006.01)

(52) U.S. Cl.
CPC ......... *G02B 27/0101* (2013.01); *G02B 27/01* (2013.01); *G02B 2027/0112* (2013.01); *G02B 2027/0118* (2013.01); *G02B 2027/0123* (2013.01); *G02B 2027/0141* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 8,004,424 B2* | 8/2011 | Matsuoka | .............. | B60Q 9/008 340/435 |
| 9,449,518 B2* | 9/2016 | Mochizuki | .............. | G08G 1/165 |
| 2008/0316011 A1* | 12/2008 | Kirsch | .................. | B60K 35/00 340/439 |
| 2013/0235200 A1* | 9/2013 | Giesler | .................. | G02B 27/01 348/148 |
| 2014/0091989 A1* | 4/2014 | Szczerba | ............... | G01S 13/723 345/7 |
| 2014/0210853 A1* | 7/2014 | Sasao | ....................... | G08G 1/04 345/629 |
| 2015/0097866 A1* | 4/2015 | Mochizuki | .............. | B60R 11/04 345/633 |
| 2017/0053440 A1* | 2/2017 | Yoon | ....................... | G06F 3/167 |

FOREIGN PATENT DOCUMENTS

JP 2016-37201 A 3/2016

* cited by examiner

*Primary Examiner* — Ryan M Gray
(74) *Attorney, Agent, or Firm* — Studebaker & Brackett PC (57) ABSTRACT

An edge of, for example, a windshield which serves as range of vision is defined by front pillars, a roof, and a dashboard. A modification area is provided at a peripheral portion of the windshield. In the modification area, visual saliency (visual conspicuousness) can be partially increased by means of, e.g., liquid crystals.

8 Claims, 8 Drawing Sheets

DEVICE CONTROLLING RANGE OF VISION

CROSS-REFERENCE TO RELATED APPLICATION

This application claims priority to Japanese Patent Application No. 2016-145886 filed on Jul. 26, 2016, the entire disclosure of which is incorporated by reference herein.

BACKGROUND

The present disclosure relates to a device which controls a range of vision.

While driving a car, a driver looks through a windshield to check the situation around the car. Japanese Unexamined Patent Publication No. 2016-37201 discloses a device which allows for visual modification of a window frame of a windshield. More specifically, visual modification can be performed by providing a peripheral portion of the windshield with a region in which a range of vision is modified using, e.g., liquid crystals, such that the range of vision is either limited or not. The range of vision is partially limited depending on, for example, driving conditions of the car, road conditions, and the situation around the car.

If a person catches a glimpse of a certain spot at which a large amount of visual features—which are referred to as visual saliency—can be found (high visual saliency), the person's line of sight is prone to be guided toward this specific spot. Visual saliency is defined as conspicuous visual features which change every moment due to color, luminance, inclination of edges, or motion. That is, when a driver looks through the windshield at the conditions ahead, the driver's eyes are prone to be naturally (subconsciously) guided in a direction with a high visual saliency.

However, when a person drives a car and looks through the windshield, which serves as range of vision, at the road conditions ahead, oftentimes the driver's eyes are directed in a completely different direction and the driver does not look at a visual target which requires attention. For example, while driving straight ahead, it can easily happen that the driver's eyes are subconsciously driven toward an eye-catching object (such as a huge illuminated advertising display) at either side of the road.

With the above situation in mind, the present disclosure attempts to provide a device which controls the range of vision such that the driver's eyes can be guided in a desired direction.

The present disclosure proposes the following solution.

A device controlling a range of vision which has a periphery defined by a frame, the device including:

a saliency modifier which modifies visual saliency in a peripheral portion of the range of vision to increase visual saliency in the peripheral portion; and a controller which controls the saliency modifier based on preset conditions such that the saliency modifier increases visual saliency in a predetermined part of the peripheral portion of the range of vision.

According to the above solution, a person's eyes are easily guided toward a portion with high visual saliency, which is why visual saliency can be effectively used to (subconsciously and calmly) guide the person's eyes in a desired direction. Further, the above solution is beneficial inasmuch as the person's eyes are guided without causing irritation or a sense of discomfort.

Beneficial embodiments of the above solution are described below.

The saliency modifier may increase visual saliency of at least three portions of the range of vision, namely a left edge, a right edge, and a top edge, and the controller may control the saliency modifier to increase visual saliency of at least one portion selected among the three portions. This embodiment is beneficial inasmuch as it allows for appropriately guiding a person's eyes either to the left, or to the right, or far ahead in a longitudinal direction.

The device may further include:

a gaze direction detector which detects a gaze direction of a person looking through the range of vision at peripheral conditions; and a visual target detector which detects a visual target a person needs to look at within the range of vision.

When a gaze direction detected by the gaze direction detector indicates that the person's eyes are not directed toward a visual target detected by the visual target detector, the controller may control the saliency modifier to increase visual saliency in a peripheral portion of the range of vision located in a direction leading toward the visual target. This embodiment is beneficial inasmuch as the person's eyes can be guided toward a visual target the person needs to pay attention to and the person does no longer look in a different direction.

The range of vision may be defined as a windshield of a moving object. Since the range of vision, i.e., the windshield, is large, there is a strong tendency of an operator who operates the moving object looking away from a visual target which requires the operator's attention. In this case, however, the operator's eyes can be guided through the windshield in a desired direction.

The controller may increase visual saliency at a top edge of the windshield when the moving object is moving straight ahead. In this case, a person's eyes are guided far ahead of the moving object.

When the moving object is turning, the controller may control the saliency modifier to increase visual saliency of a right or left edge of the windshield, depending on a turning direction. In this case, a person's eyes can be guided toward the turning direction.

The moving object may be a car.

When the moving object is moving sideways, the controller may control the saliency modifier to increase visual saliency of a right or left edge of the windshield, depending on a direction in which the moving object is moving sideways. In this case, a person's eyes can be guided toward the direction in which the moving object is moving sideways.

The range of vision may be a rear view mirror, or a wing mirror, or a display of the moving object, the display showing a set predetermined direction of the moving object. In this case, a person's eyes can be guided in a desired direction within an indirect range of vision.

The saliency modifier may increase a difference in luminance with respect to a background within the range of vision. Since a difference in luminance is easily perceived by the human eye, a person's eyes can be guided highly effectively by modifying the difference in luminance to increase visual saliency.

The saliency modifier may be capable of modifying color. In this case, colors are also used to increase visual saliency. This is beneficial inasmuch as a person's eyes can be guided even more effectively.

DETAILED DESCRIPTION

Figure 1:
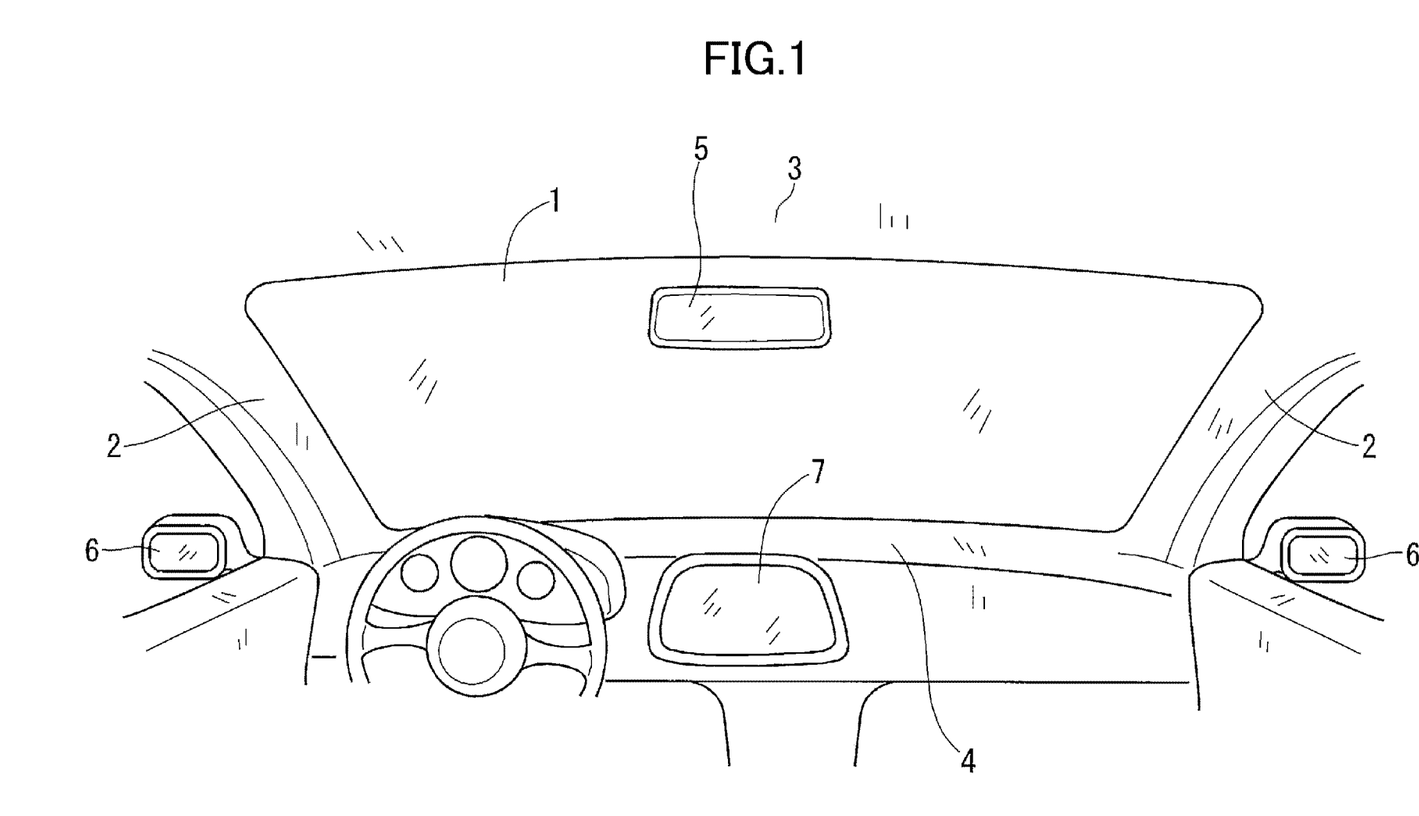
FIG. 1 illustrates a windshield which serves as a range of vision.

In FIG. 1, the reference character "1" designates a windshield of a car (vehicle). The windshield 1 has an edge, i.e., a window frame, the shape of which is defined by a pair of front pillars 2 (one at the left and one at the right), a roof 3, and a dashboard 4. In FIG. 1, the reference character "5" designates a rear view mirror, the reference character "6" a wing mirror, and the reference character "7" a screen of a navigation system. The screen 7 usually displays map information. When the car is put into reverse gear, however, the screen 7 will automatically switch to rear view and display an image produced by a backup camera. Further, in this embodiment, the indirect field of view reflected by the rear view mirror 5 and the wing mirror 6 is shown in the mirrors themselves. Alternatively, however, an image could be taken by a camera and shown on an electronic display (i.e., a screen).

Figure 2:
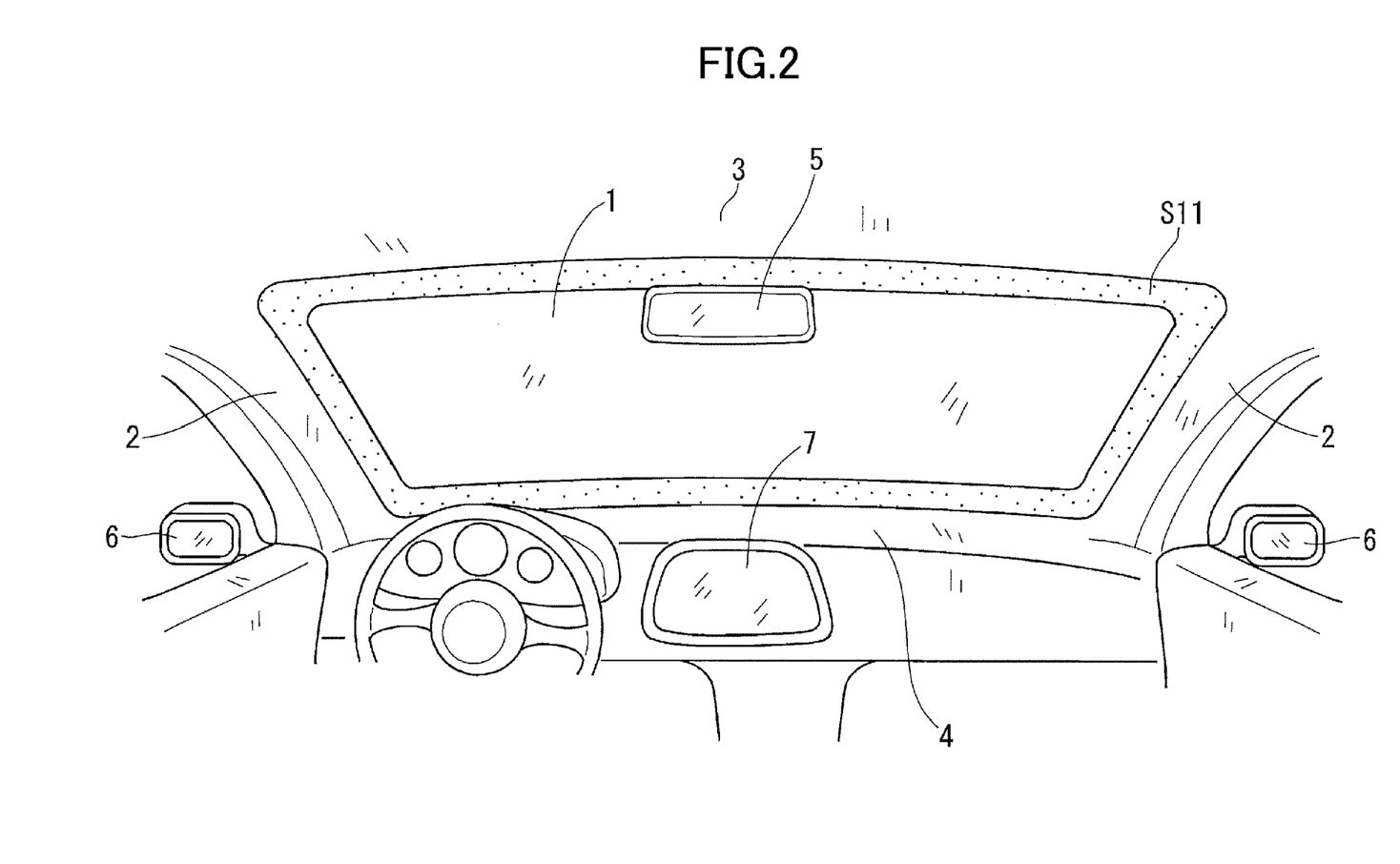
FIG. 2 illustrates an example how an area in which saliency can be increased can be set within a windshield.

As shown in FIG. 2, a modification area S11 is provided for the windshield 1. Within the modification area S11, saliency can be increased around an entire circumference of the windshield 1. As disclosed in Japanese Unexamined Patent Publication No. 2016-37201, the modification area S11 is implemented by a liquid crystal film or by projection mapping such that saliency can be increased in an arbitrary portion of the modification area S11.

Saliency in the modification area S11 is increased by increasing the difference in luminance with respect to a background. The background is defined by peripheral conditions seen through the windshield 1 (in particular the distribution of salient features which indicate the peripheral conditions) and elements which can be found in the vicinity of a peripheral portion of the windshield 1. In addition, color can also be modified. For example, if the background is predominantly grayish and blackish, a bright color (e.g., yellow) which allows to obtain an increased difference in brightness is displayed in the modification area S11. This increases luminance in the modification area S11. Note that other than applying a liquid crystal film to, or employing projection mapping to project light on, the peripheral portion of the windshield 1 itself, visual saliency of the peripheral portion of the windshield 1 can also be increased by employing a different method. Appropriate methods include, for example, installing LED lamps at a front edge of the roof 3, inner edges of the front pillars 2 in a vehicle width direction, and a front edge of the dashboard 4.

Figure 3:
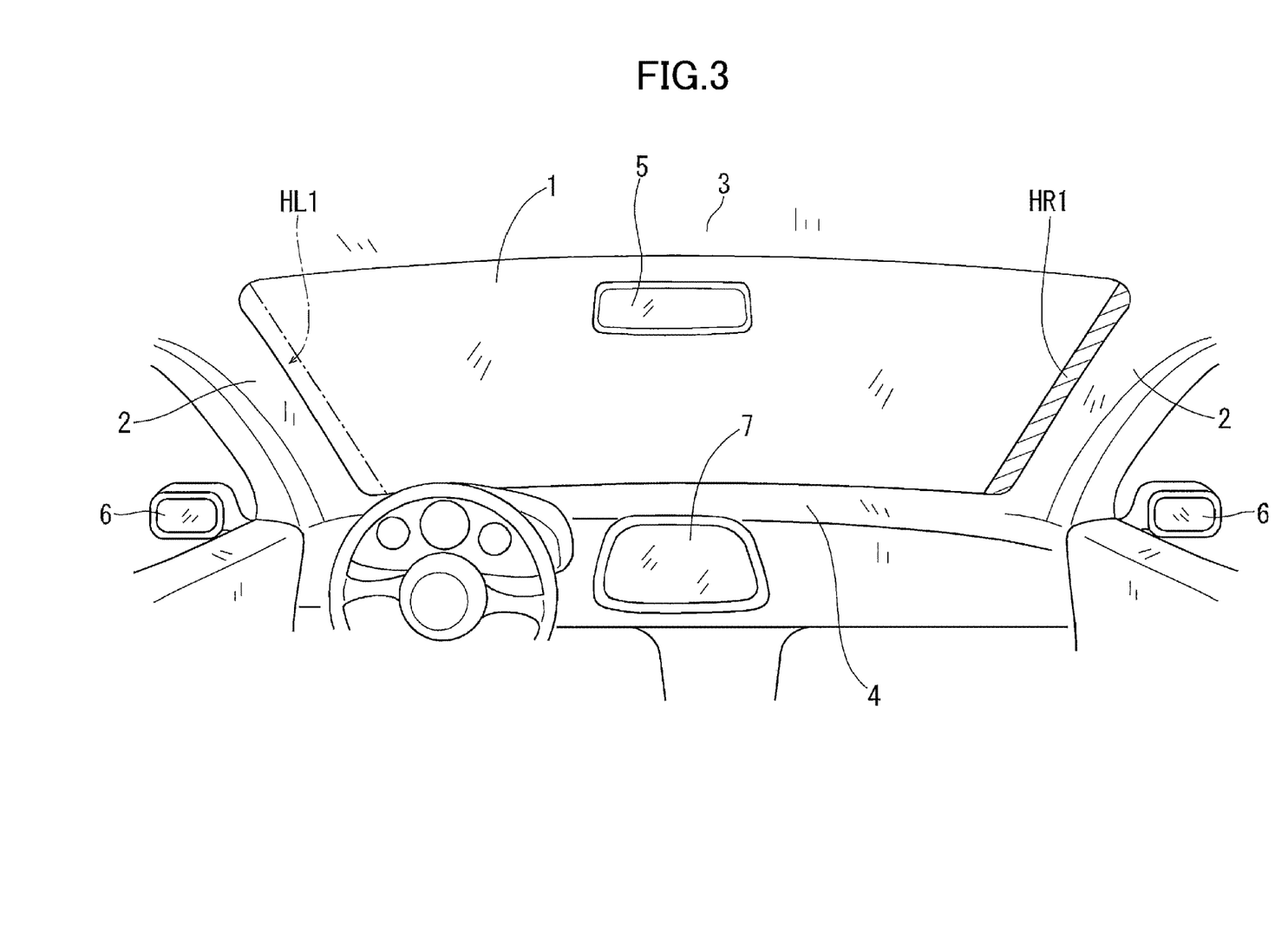
FIG. 3 illustrates a state in which saliency of side edges of a windshield has been increased.

FIG. 3 illustrates a state in which the modification area S11 is controlled to produce an area HR1 in which visual saliency (visual conspicuousness) at the right edge of the windshield 1 is increased. A driver's eyes are guided toward the area HR1 which has a high visual saliency. Specifically, setting up the area HR1 will guide the driver's eyes to the right, which is for example beneficial when the driver is turning right. When the driver is turning left, it is beneficial to set up an area HL1 in which visual saliency at the left edge of the windshield 1 is increased, as indicated by the dash-dot line in FIG. 3. Guiding a driver's eyes toward the left or to the right is not only beneficial when the driver is turning left or right but also, for example, when the driver is driving close to the roadside. Then, visual saliency in the direction of the roadside is increased.

Further, in a situation when the driver is not looking to the right while there is a visual target on the right side which requires the driver's attention, the area HR1 which features high saliency can be set up. Contrariwise, in a situation when the driver is not looking to the left while there is a visual target which requires the driver's attention on the left side, the area HL1 which features high saliency can be set up.

Figure 4:
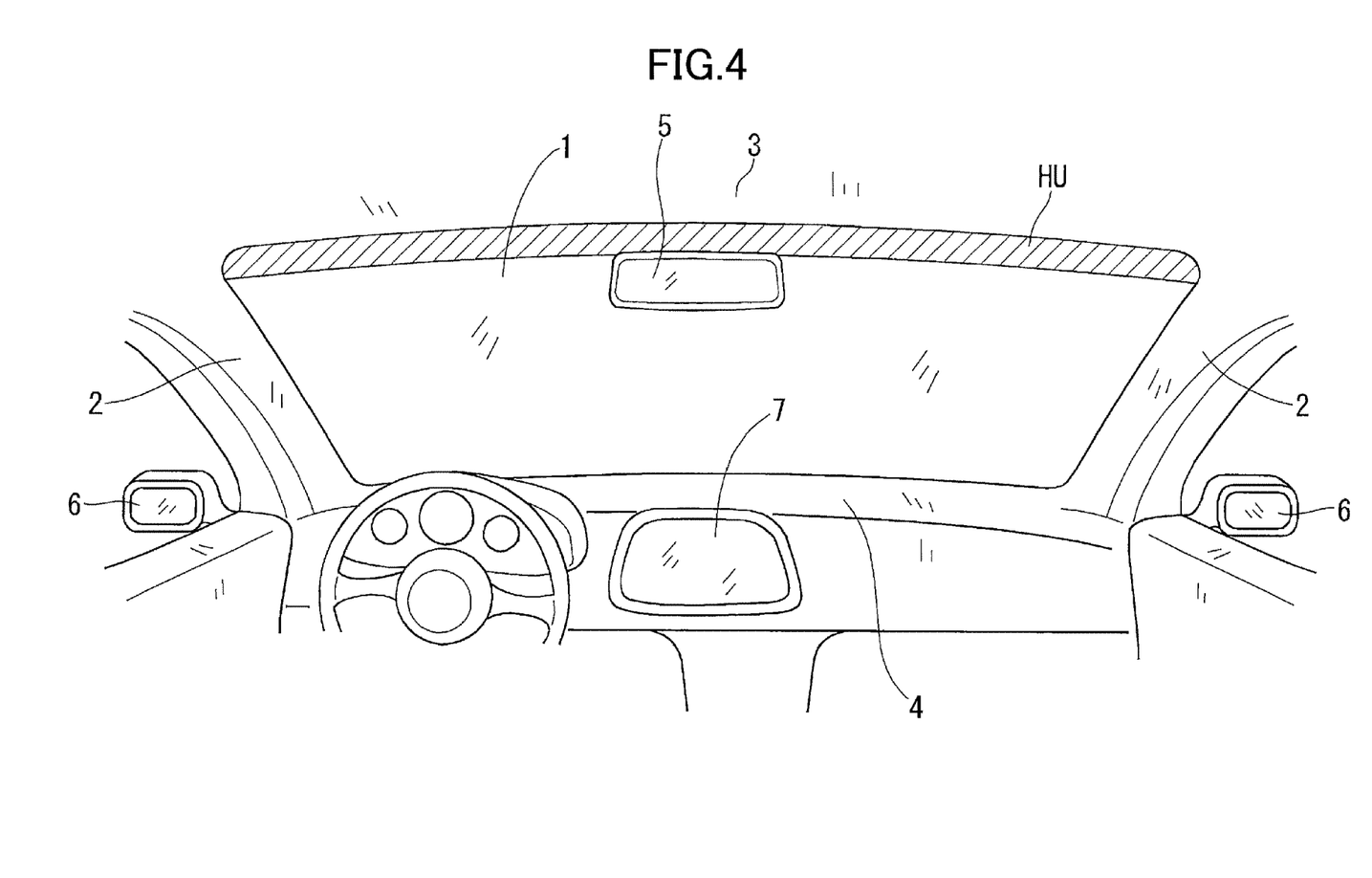
FIG. 4 illustrates a state in which saliency of a top edge of a windshield has been increased.

FIG. 4 illustrates a state in which the modification area S11 is controlled such that an area HU in which visual saliency at the top edge of the windshield 1 is increased is formed. Since the area HU features high saliency, the driver's eyes are guided toward the top edge of the windshield 1, i.e., the driver looks far ahead of the car. A configuration like the one shown in FIG. 4 is beneficial when driving straight ahead, in particular when driving straight ahead on a highway (including limited-access highways). When driving on a highway illuminated by a high number of street lamps arranged along the road, this configuration is particularly beneficial as it guides the driver's eyes far ahead such that the driver is not distracted by the street lamps at both sides of the road.

Figure 5:
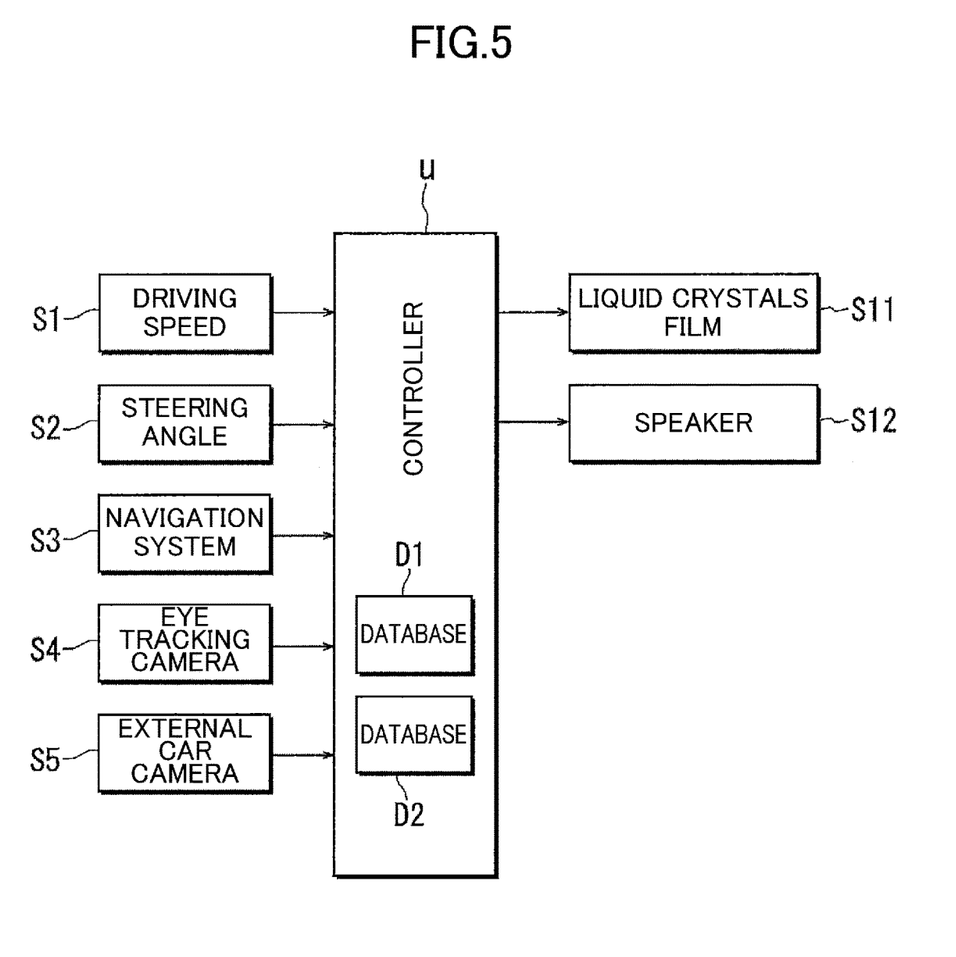
FIG. 5 illustrates a control system of the present disclosure.

FIG. 5 illustrates an example control system in which the modification area S11 limits the range of vision. In FIG. 5, the reference character "U" indicates a controller (control unit) which employs a microcomputer. Signals from all kinds of sensors and other kinds of devices (S1 to S5) are input into the control unit U. S1 is a speed sensor which detects the driving speed of a car. S2 is a steering angle sensor which detects a steering angle. S3 is a navigation system which obtains vehicle positioning information (GPS) and map information. S4 is an eye tracking camera which is for example provided at the front edge of the roof 3 to detect the gaze direction of the driver. S5 is an external car camera recording conditions in front of the car. The external car camera S5 also detects salient features within an image recorded.

Apart from controlling the modification area S11 (i.e., the liquid crystal film comprising the modification area S11) described above, the controller U also controls a speaker S12. When the driver does not notice a visual target he or she needs to pay attention to, the speaker S12 will provide an audible warning.

The controller U includes two types of databases D1 and D2. Each of the databases D1 and D2 includes a flash memory and a hard disk with a high storage capacity. The database D1 stores a large amount of data regarding visual targets the driver needs to pay attention to among the salient features. For example, data regarding stop lights of a car ahead, traffic lights, street signs (in particular illuminated ones), cars coming from the opposite direction, two-wheelers, and pedestrians are stored as visual targets.

On the other hand, the database D2 stores a large amount of data regarding salient features which are not defined as visual targets. Salient features which are not defined as visual targets for the driver and do not need to be payed attention to include, for example, illuminated roadside advertising displays, street lights, street lamps, light coming from windows of buildings, street trees, the sun, the moon, and stars. Note that memories stored in the databases D1 and D2 are divided into all kinds of driving scenarios (e.g., driving straight ahead, driving turns, driving through an urban area, driving on a highway etc.).

The controller U extracts salient features from the images recorded by the external car camera S5, collates the salient features extracted to the databases D1 and D2, and divides them into visual targets the driver needs to pay attention to and objects that do not require attention. With the help of this division, visual targets the driver needs to pay attention to are specified depending on the driving scenario.

Next, an example control process regarding limitation of the range of vision by the controller U will be explained with reference to the flow diagrams shown in FIGS. 6 and 7. Note that in the following description the reference character "Q" designates steps. First, in step Q1 of FIG. 6, signals from each of the sensors and the other devices (S1 to S5) are input into the controller U. Then, in the subsequent step Q2, the gaze direction of the driver is calculated based on detection results provided by the eye tracking camera S4.

Following step Q2, visual saliency is calculated in step Q3. Step Q3 includes a process in the scope of which visual targets which require particular attention are determined by dividing salient features within the images recorded by the external car camera S5 into visual targets the driver needs to pay attention to and objects that do not require attention, as described above. Moreover, in the scope of this process, positions (i.e., positions in the range of vision of the windshield 1 corresponding to the gaze direction) of the visual targets the driver needs to pay attention to are determined.

After step Q3, in step Q4 the driving scenario is determined. Step Q4 involves a process in which current driving conditions of the car are determined. In this embodiment, it is at least determined whether the car is driving straight ahead or taking a turn (going into a curve). Note that the driving scenario can be determined with an appropriate known method. Further, operation conditions of sensors and switches which are not shown in FIG. 5 may be additionally input and used for determination.

Subsequent to step Q4, a gaze direction leading toward a visual target the driver needs to pay attention to is calculated in step Q5. Step Q5 involves a process to determine the direction leading to a visual target the driver needs to pay attention to which has been determined in the process of step Q3. If there is more than one visual target, the driver's eyes are guided in a direction leading to the most important visual target.

Following step Q5, in step Q6 it is determined whether the gaze direction of the driver calculated in step Q2 approximately coincides with the gaze direction leading toward the visual target the driver needs to pay attention to as calculated in step Q5. If the determination performed in step Q6 results in "YES," the controller U interprets that there is no problem with the driver's visual attention and the control process returns to step Q1 (without increasing visual saliency).

If the determination performed in step Q6 results in "NO," the control process moves on to step Q7 in which visual saliency is increased in a portion of the modification area S11 provided on the windshield 1, the portion being located in a direction leading to the visual target. As a result, the driver's eyes are guided toward the visual target. Note that, if the driver is looking in a direction completely different from that leading to the visual target which requires particular attention when visual saliency is increased, the speaker S12 can generate an audible warning.

Figure 6:
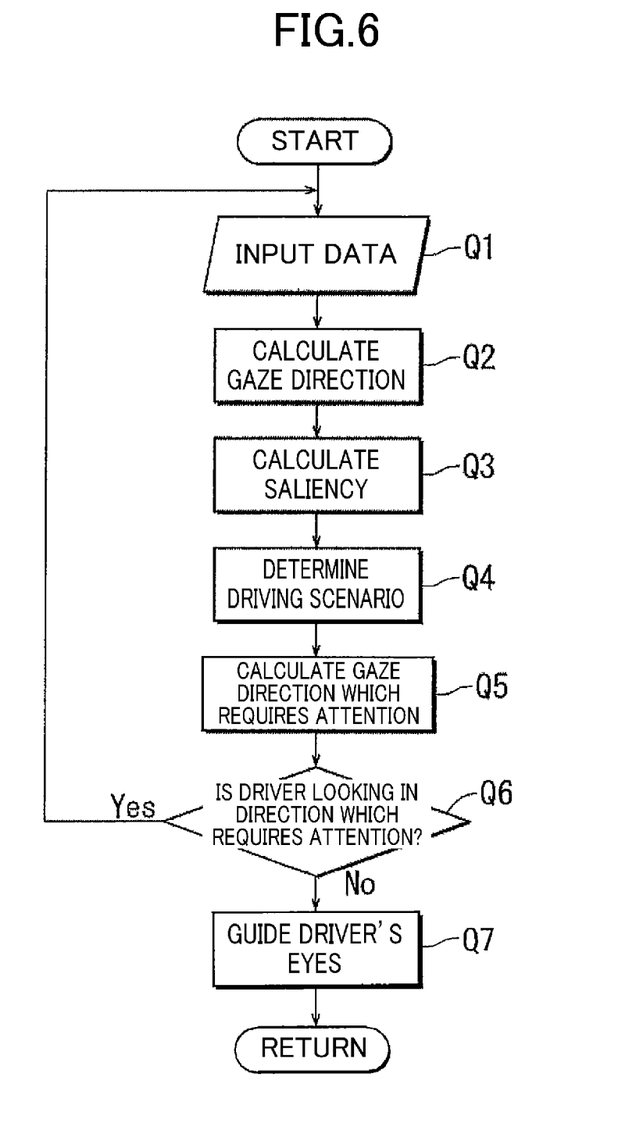
FIG. 6 is a flow diagram illustrating a control example according to the present disclosure.
Figure 7:
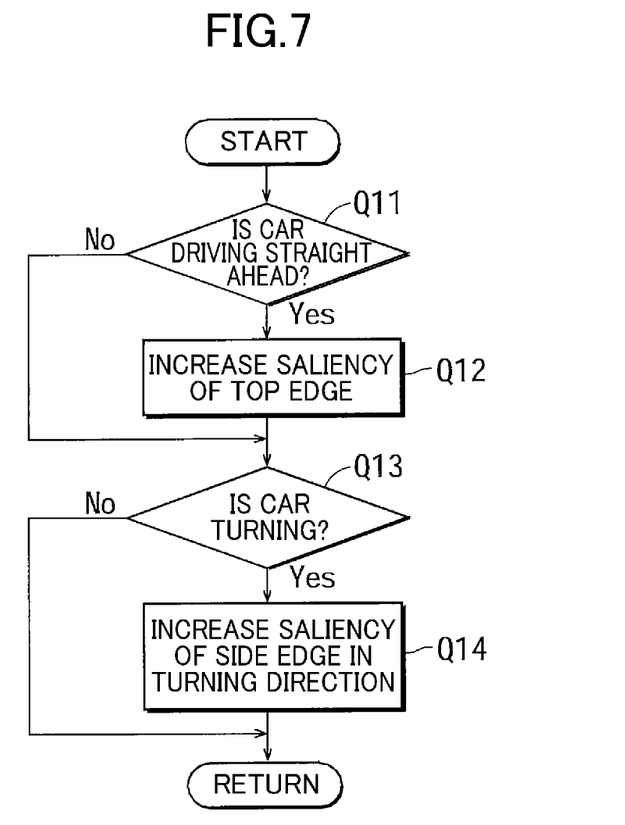
FIG. 7 is a flow diagram illustrating a different control example according to the present disclosure.

FIG. 7 illustrates an example variation of step Q7 of FIG. 6: Regardless of whether the driver is looking in a direction of a visual target or not, the driver's eyes are guided in a beneficial direction depending on a driving scenario. More specifically, in step Q11 in FIG. 7 it is determined whether the car is currently driving straight ahead. If the determination performed in step Q11 results in "YES," the control process moves on to step Q12 in the scope of which visual saliency of the top edge of the windshield 1 is increased as shown in FIG. 4, and the driver's eyes are guided such that the driver looks far ahead of the car.

If the determination performed in step Q11 results in "NO," or if step Q12 has been completed, the control process moves on to step Q13 in the scope of which it is determined whether the car is turning or not. If the determination performed in step Q13 results in "YES," the control process moves on to step Q14 in the scope of which—depending on the turning direction—visual saliency of either the right or left edge of the windshield 1 is increased, as shown in FIG. 3.

If the driver is looking in a direction completely different from that leading to the visual target which requires particular attention while a control process like the one illustrated in FIG. 7 is performed, this control process may be performed in combination with a control process in the scope of which visual saliency is increased such that the driver's eyes are guided in a direction leading to this visual target. Specifically, for example in a state where visual saliency of the top edge of the windshield 1 is increased because the car is driving straight ahead, visual saliency of the right edge of the windshield 1 may be increased when the driver is looking to the left. In this case, when visual saliency of the right edge has been increased, increasing visual saliency of the top edge may be temporarily interrupted.

Figure 8:
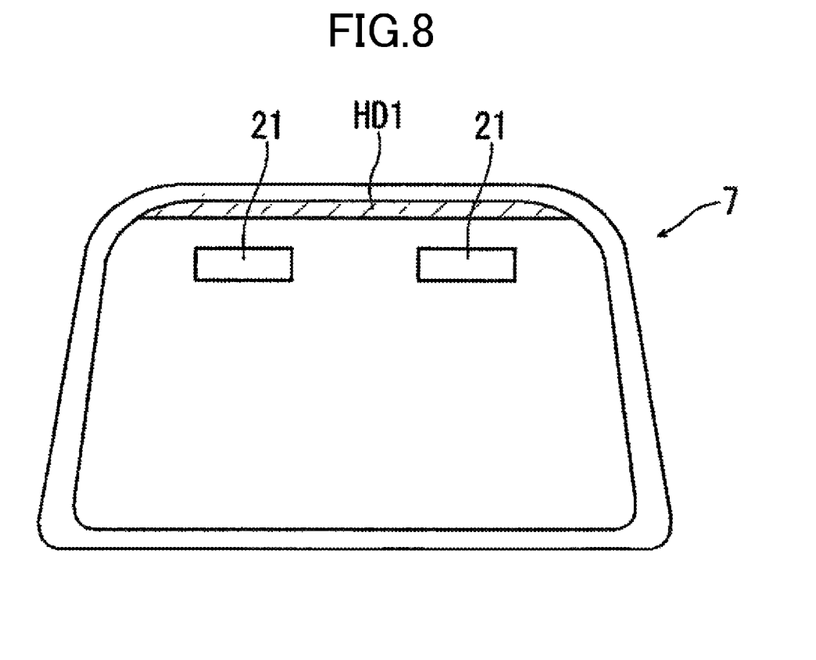
FIG. 8 illustrates a state in which saliency of a top edge of a screen which displays a rear view has been increased.
Figure 9:
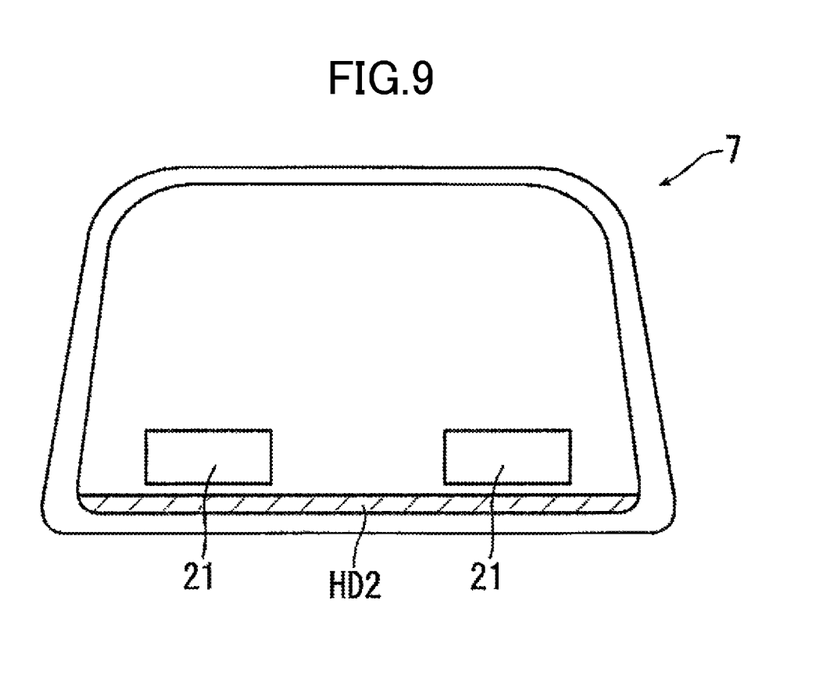
FIG. 9 illustrates a state in which a location at which saliency has been increased has been modified to be different from the state shown in FIG. 8.

FIGS. 8 and 9 illustrate a case example in which a control process is performed to increase visual saliency regarding a rear view (indirect range of vision which is an image recorded by the backup camera) displayed on a screen 7 when a reverse gear of a transmission has been engaged. More specifically, FIG. 8 illustrates a case where, when the car is moving backwards toward obstacles 21, there is a large distance between the car and the obstacles 21. In this case, the driver's eyes need to be guided toward the obstacles 21 far away, and an area HD1 in which visual saliency of a top edge of the screen 7 is increased is set up. As shown in FIG. 9, when the distance between the car and the obstacles 21 becomes smaller, the driver's eyes need to be guided toward the obstacles 21 which are now close to the car, and an area HD2 in which visual saliency of a bottom edge of the screen 7 is increased is set up.

The present disclosure is not limited to the above-explained embodiments. Appropriate changes and modifications may be made in the scope of the present disclosure. A level to which visual saliency is increased may be modified such that, in relation to the background (peripheral conditions) within the range of vision, a difference in luminance of at least a predetermined degree is obtained. Visual saliency can also be increased at a bottom edge of a range of vision (e.g., the windshield 1), for example when driving through an urban area where many pedestrians and two-wheelers are present around the car to guide the driver's eyes toward the vicinity of the car. In the same manner, control can be performed to increase visual saliency of peripheral portions of indirect ranges of vision, such as the rear view mirror 5 or the wing mirror 6. In addition to the difference in luminance and color, another appropriate method, such as for example taking advantage of "motion," can be used to increase visual saliency. For example, regarding the peripheral portion of the windshield 1, a partially illuminated part may be moved back and forth or allowed to blink.

Moreover, visual saliency can be increased in a variety of portions. For example, visual saliency can be increased not along the entire length of one of the side edges of the windshield 1 (range of vision), but only on a part of the side edge, such as an intermediate portion in a vertical direction, an upper end portion, or a lower end portion. The same applies to the top edge and the bottom edge: visual saliency can be increased not along the entire length of the top edge/bottom edge, but only on a part of the top edge/bottom edge, such as an intermediate portion in a lateral direction, a left end portion, or a right end portion. Furthermore, taking the windshield 1 as an example, when increasing visual saliency of a left end in the vehicle width direction of the top edge and an upper end of the left side edge, the driver's eyes can be guided diagonally upwards to the left. Contrariwise, when increasing visual saliency of a right end in the vehicle width direction of the top edge and an upper end of the right side edge, the driver's eyes can be guided diagonally upwards to the right. In the same manner, when increasing visual saliency of a left end in the vehicle width direction of the bottom edge and a lower end of the left side edge, the driver's eyes can be guided diagonally downwards to the left. Contrariwise, when increasing visual saliency of a right end in the vehicle width direction of the bottom edge and a lower end of the right side edge, the driver's eyes can be guided diagonally downwards to the right.

The present disclosure can also be applied in a similar manner for various kinds of vehicles (airplanes, boats, trains etc.) apart from cars. Moreover, other than vehicles, this disclosure can also be applied in a similar manner, for example, with regard to a range of vision when visually surveilling a fixed site. Of course, the present disclosure is not limited to what is specified in this description, and also implicitly includes helping to provide an object with a substantially beneficial or advantageous design.

What is claimed is:

1. A device controlling a windshield of a car which has a periphery defined by a frame, the device comprising:
   a saliency modifier which increases visual saliency of at least three portions of the windshield, namely, a vertical entire length of a left edge, a vertical entire length of a right edge, and a lateral entire length of a top edge by modifying luminance; and
   a controller which controls the saliency modifier such that the saliency modifier increases visual saliency by modifying luminance in at least one portion selected among the three portions based on preset conditions along an entire length of the one portion;
   wherein the controller controls the saliency modifier based on current driving conditions of the car to thereby direct a driver's gaze towards a visual target requiring particular attention.

2. The device of claim 1, further comprising:
   a gaze direction detector which detects a gaze direction of a driver looking through the windshield at peripheral conditions; and
   a visual target detector which detects the visual target the driver needs to look at within the windshield, wherein,
   when a gaze direction detected by the gaze direction detector indicates that the person's eyes are not directed toward the visual target detected by the visual target detector, the controller controls the saliency modifier to increase visual saliency of the portion located in a direction leading toward the visual target.

3. The device of claim 1, wherein
   the controller increases visual saliency at a top edge of the windshield when the car is moving straight ahead.

4. The device of claim 1, wherein,
   when the car is turning, the controller controls the saliency modifier to increase visual saliency of either a right edge or a left edge of the windshield, depending on a turning direction.

5. The device of claim 1, wherein,
   when the car is turning, the controller controls the saliency modifier to increase visual saliency of either a right edge or a left edge of the windshield, depending on a turning direction.

6. The device of claim 1, wherein
   when the car is moving sideways, the controller controls the saliency modifier to increase visual saliency of either a right edge or a left edge of the windshield, depending on a direction in which the car is moving sideways.

7. The device of claim 1, wherein
   the saliency modifier increases a difference in luminance with respect to a background within the range of vision.

8. The device of claim 7, wherein
   the saliency modifier is capable of modifying color.

* * * * *